J. C. COX.
COTTON-SEED PLANTER.
No. 174,663. Patented March 14, 1876.
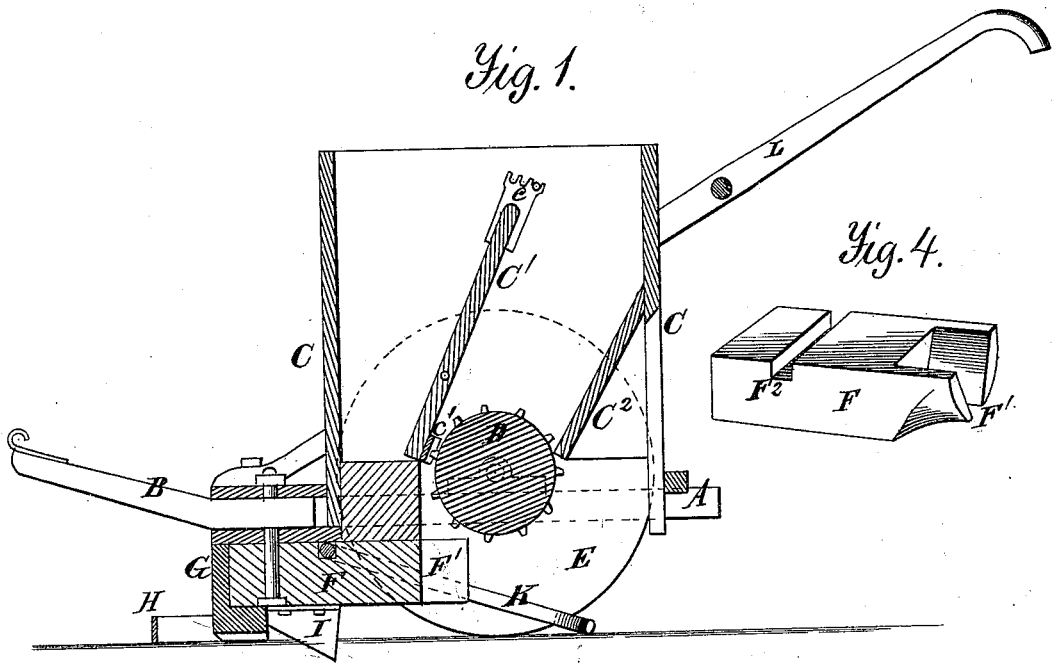
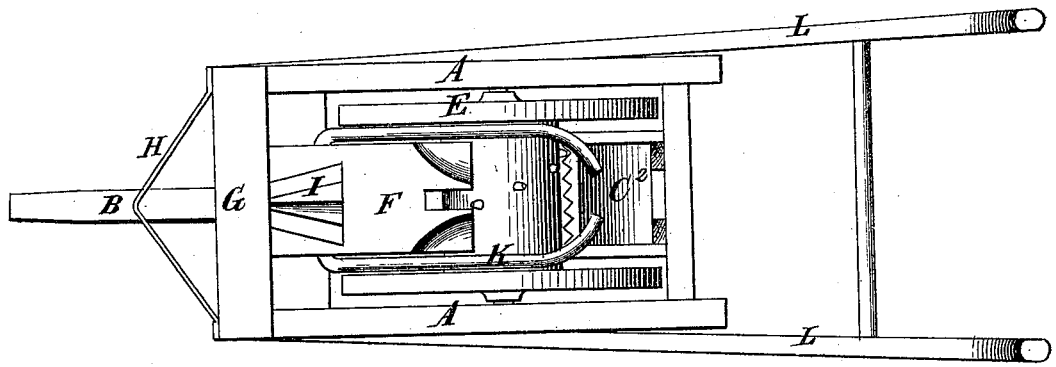
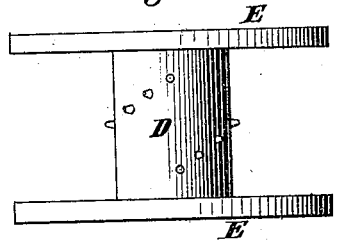

UNITED STATES PATENT OFFICE.

JOHN C. COX, OF GREENVILLE, NORTH CAROLINA.

IMPROVEMENT IN COTTON-SEED PLANTERS.

Specification forming part of Letters Patent No. 174,663, dated March 14, 1876; application filed January 6, 1876.

*To all whom it may concern:*

Be it known that I, JOHN C. COX, of Greenville, in the county of Pitt and State of North Carolina, have invented a new and useful Improvement in Cotton-Seed Planters, of which the following is a specification:

In the annexed drawings, making a part of this specification, Figure 1 is a vertical longitudinal section. Fig. 2 is a bottom view, and Fig. 3 is a plan of the wheels and seed-cylinder. Fig. 4 is a perspective view of the shoe.

The same letters are employed in all the figures in the indication of parts which are identical.

A is a frame, which carries the working mechanism. A free swinging beam, B, is fastened to it in front, in such manner that the horses may deviate somewhat from the ridge without drawing off the planter. C is the hopper in which the seed is carried. It is divided into compartments by the adjustable partition $C^1$, which is hung upon pins, permitting the adjustment of the bottom in relation to the wheel D, so as to regulate the amount of seed discharged. A series of notches in the edge of the plate $c$ are intended to receive a pin passed through the side of the hopper, and so hold the partition $C^1$ in any designed position. A serrated plate, $c'$, on the lower end of $C^1$ permits the partition to be set up against or near to the face of the wheels, the serrations being so disposed that the teeth shall pass between the points. The partition $C^1$ and the inclined board $C^2$ direct the seeds into the cylinder, so that no stirrers are necessary. D is the feed-roller, which is formed with a series of spirally-disposed pins, to engage and draw down the seeds from the hopper. On either end, and setting up against the end of the cylinder, are the wheels E E, which run within the frame, so as to be less liable to become entangled or obstructed. In front of the roller is the shoe F, the front end of which is cut away into a notch, to receive the seeds as they are drawn down from the hopper by the pins on the cylinder, and guide them into the middle of the ridge. The shoe is firmly fixed into the frame, and carries in front the leveler G, which is a beam of wood or a strong plank, which runs along the earth and makes smooth the path for the planter. It may be armed in front with a fender, H, to throw pieces of trash to one side.

The lower edge of the leveler may be protected with metal and made sharp, if preferred.

On the under side of the shoe is fitted a metallic plate, bent to an inclined edge, to open a furrow to receive the seed dropping from the slot or notch $F'$ in the rear end of the shoe. This I denominate the "opener." A bent rod of iron, K, passes through a notch in the upper face of the shoe near the front end, and is then carried back parallel to and along the sides of the shoe, until, after passing the point where the seed is dropped from the feed-cylinder D, it is curved at both ends, as shown in Fig. 2, bringing the ends near together. This is the coverer, and its office is to draw the earth from each side and over the seeds, and cover them with a little ridge of earth. The open space between the ends will permit clods or trash to pass without dragging so as to disturb the seeds.

L L are the handles, by which the planter is guided and held in position by the driver.

The wheels setting against the solid ends of the cylinder give greater firmness to the action of the machine, and protect it from a wringing strain more perfectly than where the wheels are hung upon an axle in the usual manner.

What I claim as my invention, and desire to secure by Letters Patent as an improvement in cotton-seed planters, is—

1. The coverer K, formed by a bent rod, the curved points of which are arranged in relation to the feeding mechanism, substantially as set forth.

2. In combination with the frame and planting-roller, the wheels placed inside of the frame, and abutting against the solid ends of the cylindrical roller, substantially as set forth.

3. In combination with the planter guided by handles L L, the free swinging draft-beam B, for allowing the horses to deflect from the line of draft while the planter is held on the ridge, substantially as set forth.

4. In combination with the cylinder D for drawing down the seeds successively, the shoe F, having an inclined notch at F', and coverer K, substantially as set forth.

5. In combination, the cylinder D for dropping the seed, the leveler G for preparing the ground, the opener I, the shoe with inclined notch F', and the coverer K, substantially as set forth.

In testimony whereof I have signed my name to this specification in the presence of two subscribing witnesses.

JOHN C. COX.

Witnesses:
ALEX. S. BLOW,
E. A. WILSON.